(12) United States Patent
Yao et al.

(10) Patent No.: US 11,529,969 B2
(45) Date of Patent: Dec. 20, 2022

(54) PULL OVER METHOD BASED ON QUADRATIC PROGRAMMING FOR PATH PLANNING

(71) Applicants: Baidu USA LLC, Sunnyvale, CA (US); Baidu.com Times Technology (Beijing) Co., Ltd., Beijing (CN)

(72) Inventors: Dongchun Yao, Sunnyvale, CA (US); Fan Zhu, Sunnyvale, CA (US); Leibing Lv, Beijing (CN); Xin Xu, Beijing (CN); Ning Yu, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 39 days.

(21) Appl. No.: 16/759,171

(22) PCT Filed: Apr. 10, 2020

(86) PCT No.: PCT/CN2020/084257
§ 371 (c)(1),
(2) Date: Apr. 24, 2020

(87) PCT Pub. No.: WO2021/203426
PCT Pub. Date: Oct. 14, 2021

(65) Prior Publication Data
US 2021/0316749 A1    Oct. 14, 2021

(51) Int. Cl.
*B60W 30/18*    (2012.01)
*G06F 17/12*    (2006.01)
*B60W 60/00*    (2020.01)
*G06V 20/56*    (2022.01)

(52) U.S. Cl.
CPC .... *B60W 60/001* (2020.02); *B60W 30/18163* (2013.01); *G06F 17/12* (2013.01); *G06V 20/588* (2022.01); *B60W 2552/53* (2020.02)

(58) Field of Classification Search
CPC ......... B60W 60/001; B60W 30/18163; B60W 2552/53; G06F 17/12; G06K 9/00798
See application file for complete search history.

(56) References Cited

U.S. PATENT DOCUMENTS

2017/0057510 A1* 3/2017 Herbach ............ B62D 15/0265

FOREIGN PATENT DOCUMENTS

WO    WO-2018217526 A1 * 11/2018 ............. G08G 1/207

OTHER PUBLICATIONS

OSA_2018_Algorithmic Imitation Learning (Year: 2018).*

* cited by examiner

*Primary Examiner* — Peter D Nolan
*Assistant Examiner* — Ashley L Redhead, Jr.
(74) *Attorney, Agent, or Firm* — Womble Bond Dickinson (US) LLP

(57) ABSTRACT

In response to a request to pull over an ADV at a destination point at a side of a lane, a path including a first segment, a second segment and a transition point is planned. The transition point is determined based on at least one of a distance to the destination point or a predetermined distance to a boundary of the side of the lane. The first segment from a start point to the transition point is generated by using a quadratic programming (QP) operation. The second segment from the transition point to the destination is generated based on a shape of the boundary. The ADV is controlled to pull over to the destination point according to the planned path.

18 Claims, 9 Drawing Sheets

PULL OVER METHOD BASED ON QUADRATIC PROGRAMMING FOR PATH PLANNING

CROSS-REFERENCE TO RELATED APPLICATION

This patent application is a U.S. National Phase Application under 35 U.S.C. § 371 of International Application No. PCT/CN2020/084257, filed Apr. 10, 2020, entitled "PULL OVER METHOD BASED ON QUADRATIC PROGRAMMING FOR PATH PLANNING," which is incorporated by reference herein by its entirety.

TECHNICAL FIELD

Embodiments of the present disclosure relate generally to operating autonomous vehicles. More particularly, embodiments of the disclosure relate to path panning of an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. At the end of every autopilot mission, an ADV is expected to stop on a right side of a lane, which is convenient for passengers to get on and off. However, it is challenging for the ADV to precisely pull over such that a distance between a whole body of the ADV and a right boundary of the lane is small, and the ADV is parallel to the right boundary.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an ADV may be expected to stop on a right side of a lane, which is convenient for passengers to get on and off. A method for the ADV to precisely pull over based on quadratic programming is disclosed herein. The method may provide distance accuracy and success rate. By using this method, a distance between a whole body of the ADV and a right side or boundary of the lane is to be small, and the ADV is to be parallel to the right side or boundary of the lane.

According to some embodiments, in response to a request to pull over an ADV at a destination point at a side of a lane, a path including a first segment, a second segment and a transition point is planned. The transition point is determined based on at least one of a distance to the destination point or a predetermined distance to a boundary of the side of the lane. The first segment from a start point to the transition point is generated by using a quadratic programming (QP) operation. The second segment from the transition point to the destination is generated based on a shape of the boundary. The ADV is controlled to pull over to the destination point according to the planned path.

Figure 1:
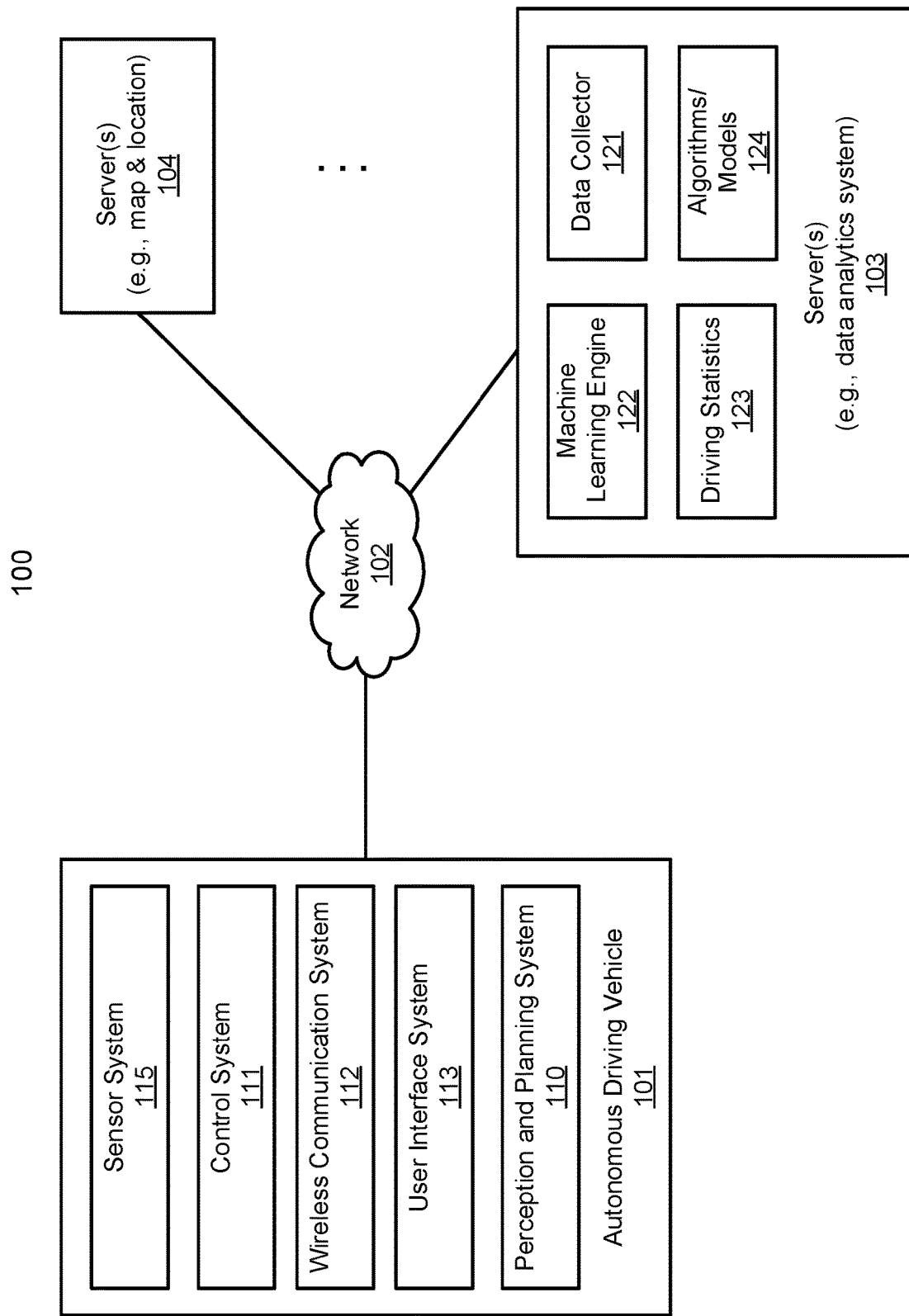
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
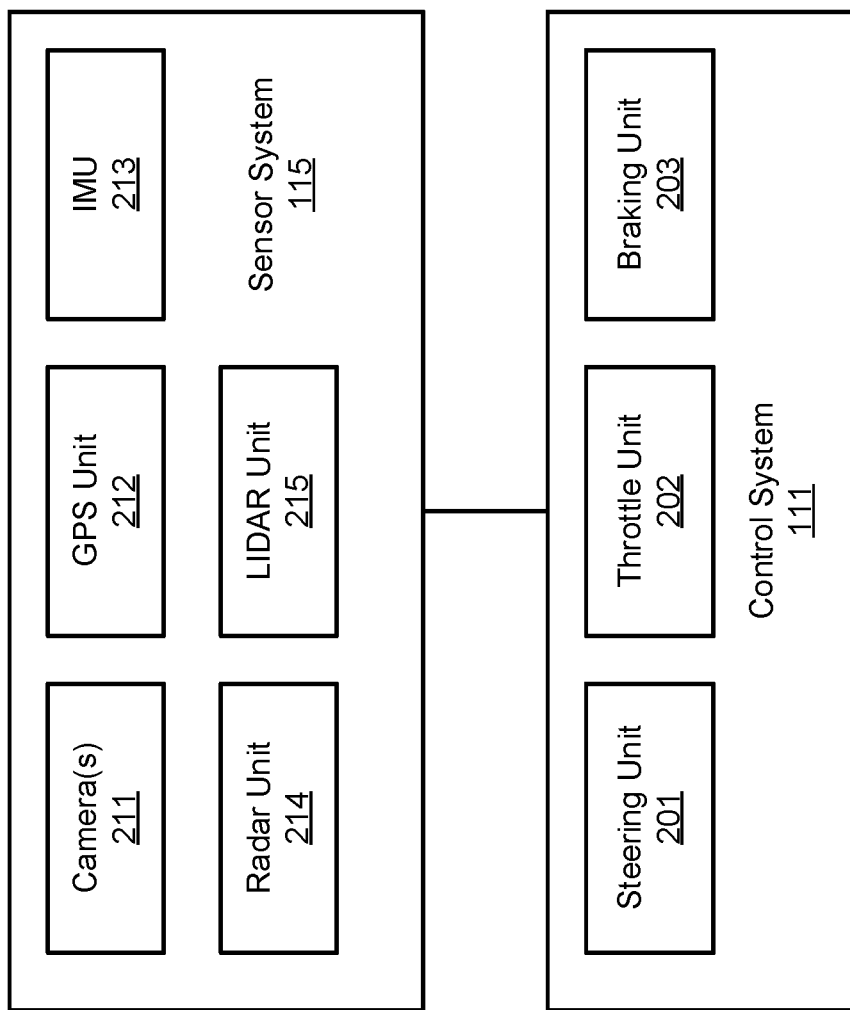
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model, in response to a request to pull over an ADV at a destination point at a side of a lane, to plan a path including a first segment, a second segment and a transition point, an algorithm to determine the transition point based on at least one of a distance to the destination point or a predetermined distance to a boundary of the side of the lane, an algorithm to generate the first segment from a start point to the transition point by using an QP operation, an algorithm to generate the second segment from the transition point to the destination based on a shape of the boundary, and/or an algorithm or model to control the ADV to pull over to the destination point according to the planned path. Algorithms 124 can then be uploaded on ADVs (e.g., models 313 of FIG. 3A) to be utilized during autonomous driving in real-time.

Figure 3A:
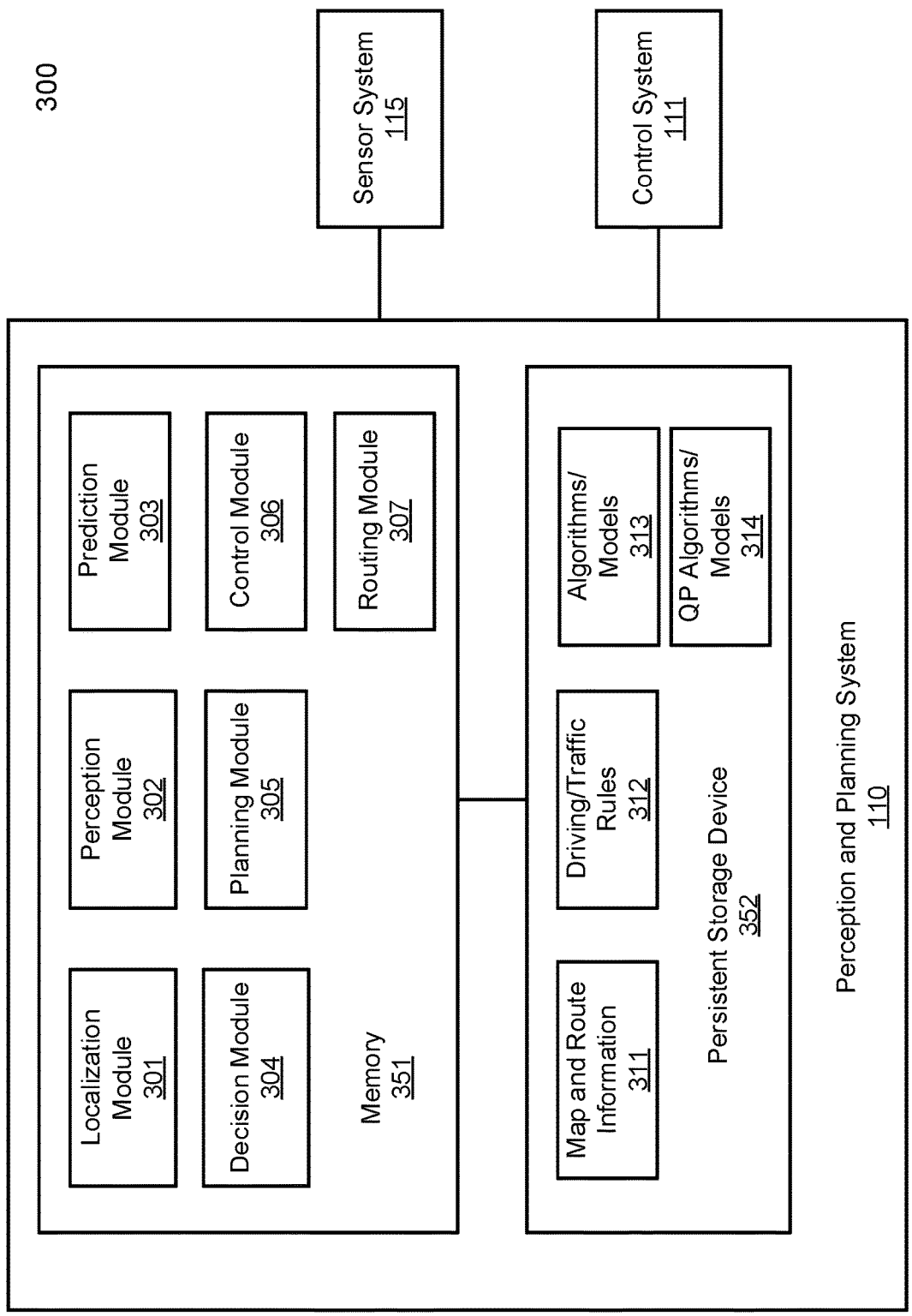
FIGS. 3A-3B are block diagrams illustrating an example of a perception and planning system used with an autonomous vehicle according to one embodiment.
Figure 3B:
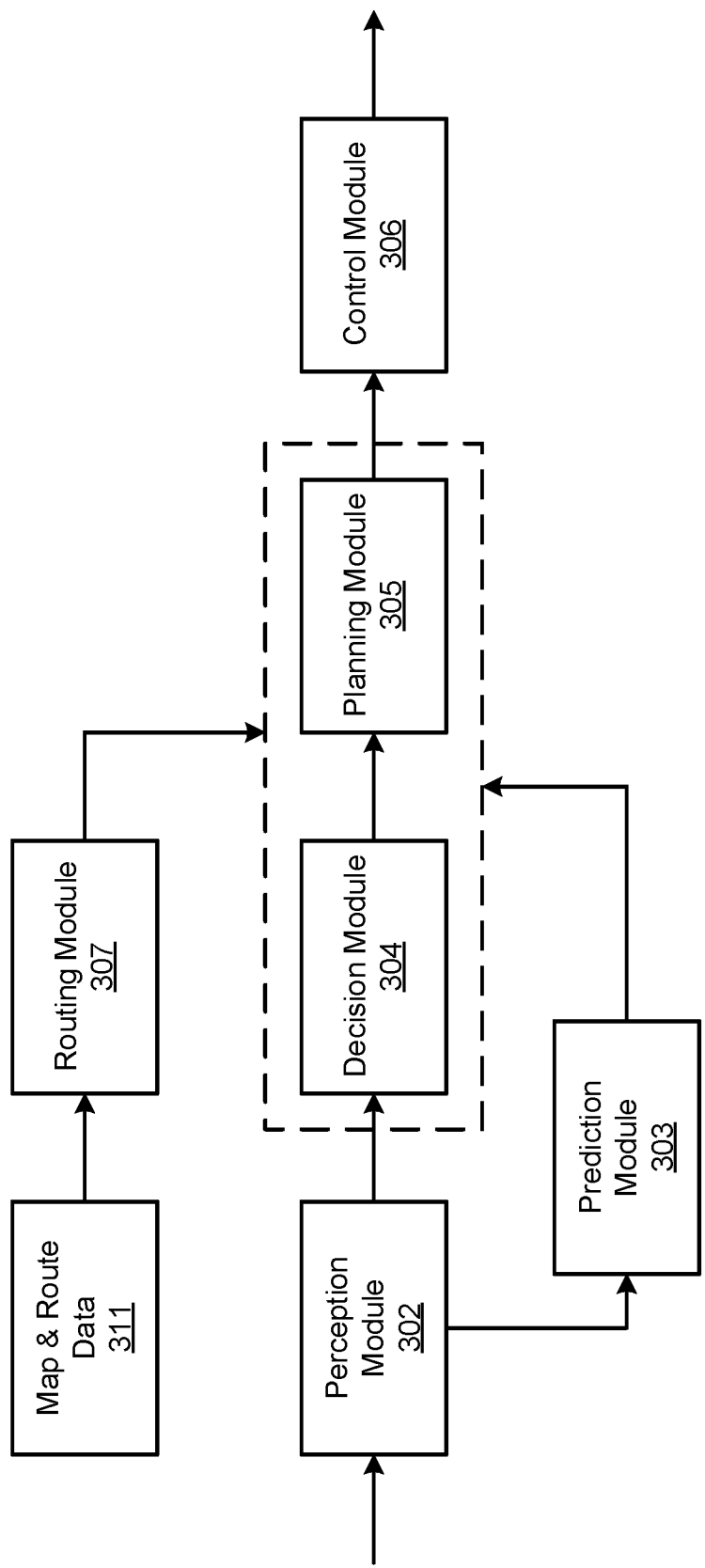

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

In some embodiments, reference points may be converted into a relative coordinates system, such as station-lateral (SL) coordinates. A station-lateral coordinate system is a coordinate system that references a fixed reference point to follow a reference line. For example, a (S, L)=(1, 0) coordinate can denote one meter ahead of a stationary point (i.e., the reference point) on the reference line with zero meter lateral offset. A (S, L)=(2, 1) reference point can denote two meters ahead of the stationary reference point along the reference line and one meter lateral offset from the reference line, e.g., offset to the left by one meter.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, planning module 305 is configured to, in response to a request to pull over an ADV at a destination point at a side of a lane, plan a path including a first segment, a second segment and a transition point. Planning module 305 is configured to determine the transition point based on at least one of a distance to the destination point or a predetermined distance to a boundary of the side of the lane. Planning module 305 is configured to generate the first segment from a start point to the transition point by using an QP operation. Planning module 305 is further configured to generate the second segment from the transition point to the destination based on a shape of the boundary. Control module 306 is configured to control the ADV to pull over to the destination point according to the planned path.

Figure 4:
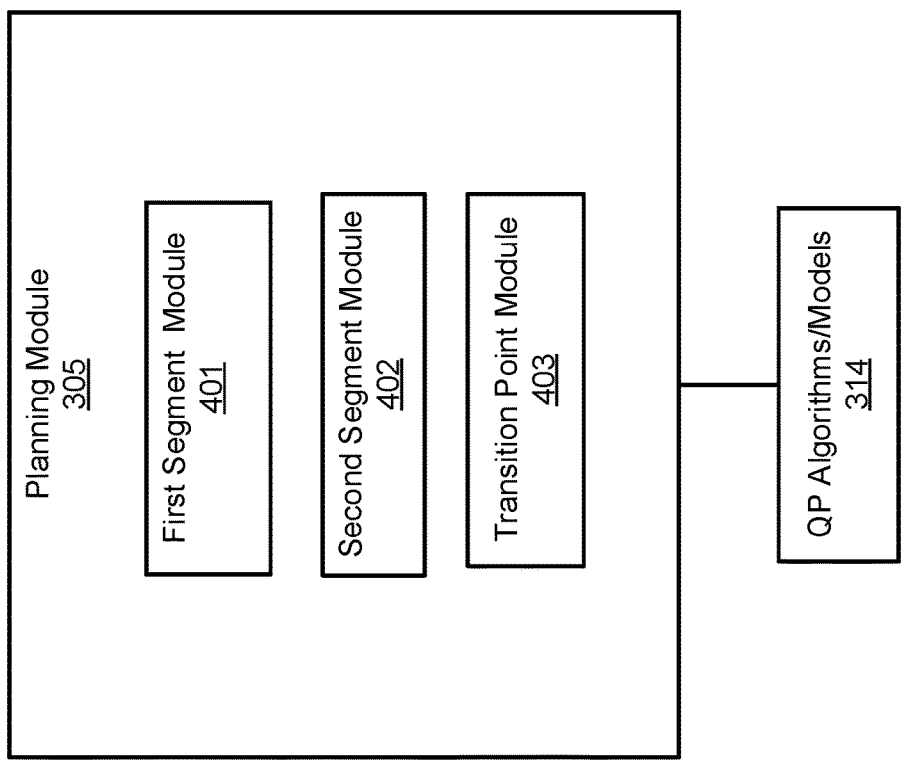
FIG. 4 is a block diagram illustrating an example of a planning module according to one embodiment.
Figure 5:
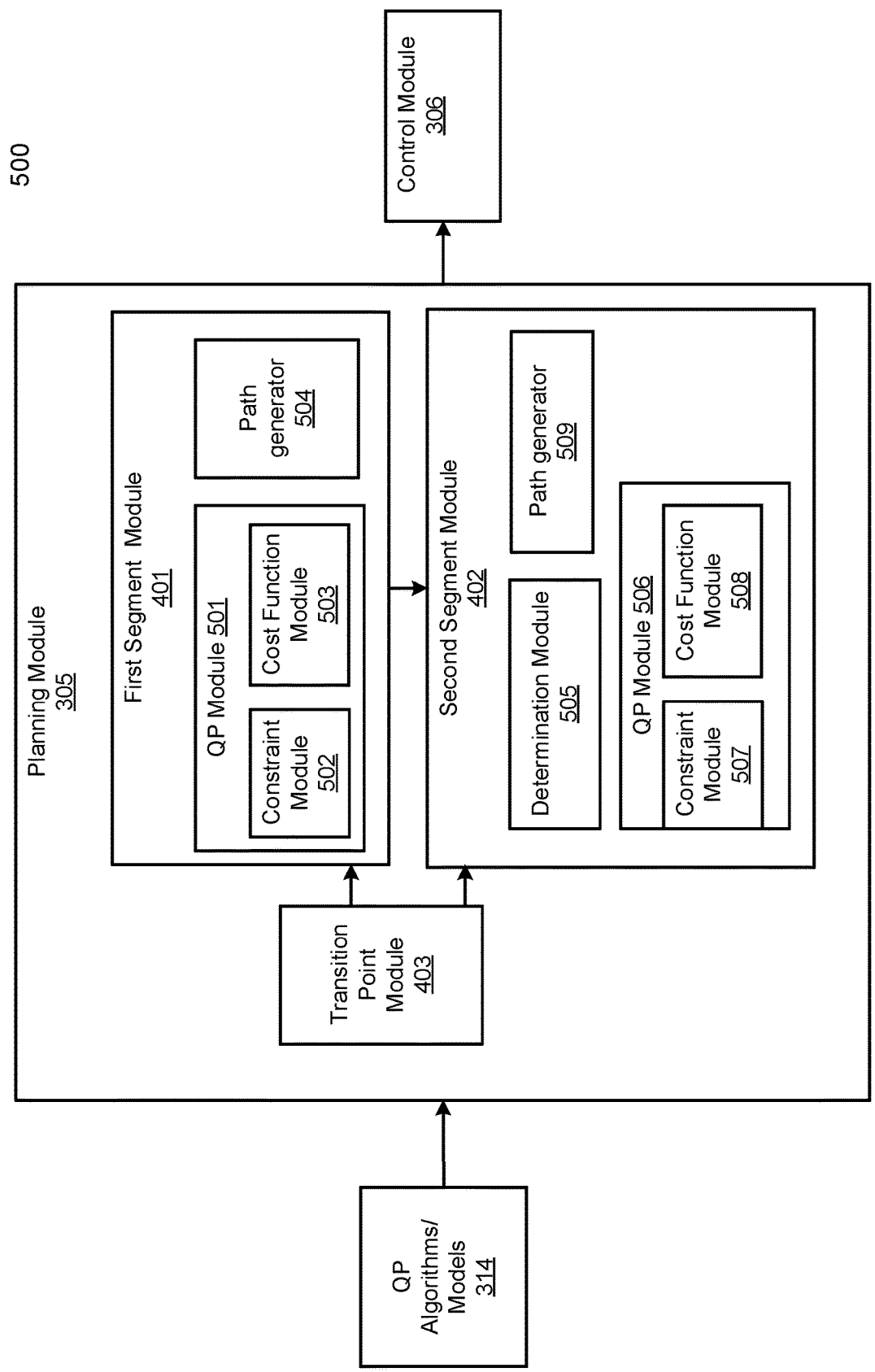
FIG. 5 is a processing flow diagram of a planning module according to one embodiment.

FIG. 4 is a block diagram 400 illustrating an example of a planning module and FIG. 5 is a processing flow diagram 500 of a planning module according to one embodiment. Referring to FIG. 4 and FIG. 5, planning module 305 includes, but is not limited to, first segment module 401, second segment module 402, and transition point module 403, which work together using QP algorithms or models 314 to pull over an ADV to a destination point according to a planned path. Note that modules 401-403 may be integrated into fewer number of modules or a single module.

According to one embodiment, in response to a request to pull over an ADV at a destination point at a side of a lane, planning module 305 is configured to plan a path including a first segment, a second segment and a transition point. Transition point module 403 may be configured to determine the transition point based on at least one of a distance to the destination point or a predetermined distance to a boundary of the side of the lane. First segment module 401 is configured to generate the first segment from a start point to the transition point by using an QP optimization through QP module 501. Second segment module 402 is configured to generate the second segment from the transition point to the destination based on a shape of the boundary. Control module 306 is configured to control the ADV to pull over to the destination point according to the planned path.

In one embodiment, first segment module 401 includes, but is not limited to, QP module 501 including constraint module 502 and cost function module 503, and path generator 504. Constraint module 502 may be configured to determine a right constrain for the first segment based on a right boundary of the lane. Constraint module 502 may be further configured to determine a left constrain for the first segment. Cost function module 503 is configured to determine a cost function based on at least one of a distance between the planned path and a reference line, or a smoothing level of the planned path. Path generator 504 is configured to generate the first segment of the path.

In one embodiment, second segment module 402 includes, but is not limited to, determination module 505, QP module 506 including constraint module 507 and cost function module 508, and path generator 509. Determination module 505 may be configured to determine whether the shape of the boundary is smooth. Constraint module 502 may be further configured to determine a right constraint and a left constrain for the second segment. Cost function module 508 is configured to determine a cost function based on at least one of a distance between the planned path and a reference line, or a smoothing level of the planned path. Path generator 509 is configured to generate the second segment of the path.

Figure 6:
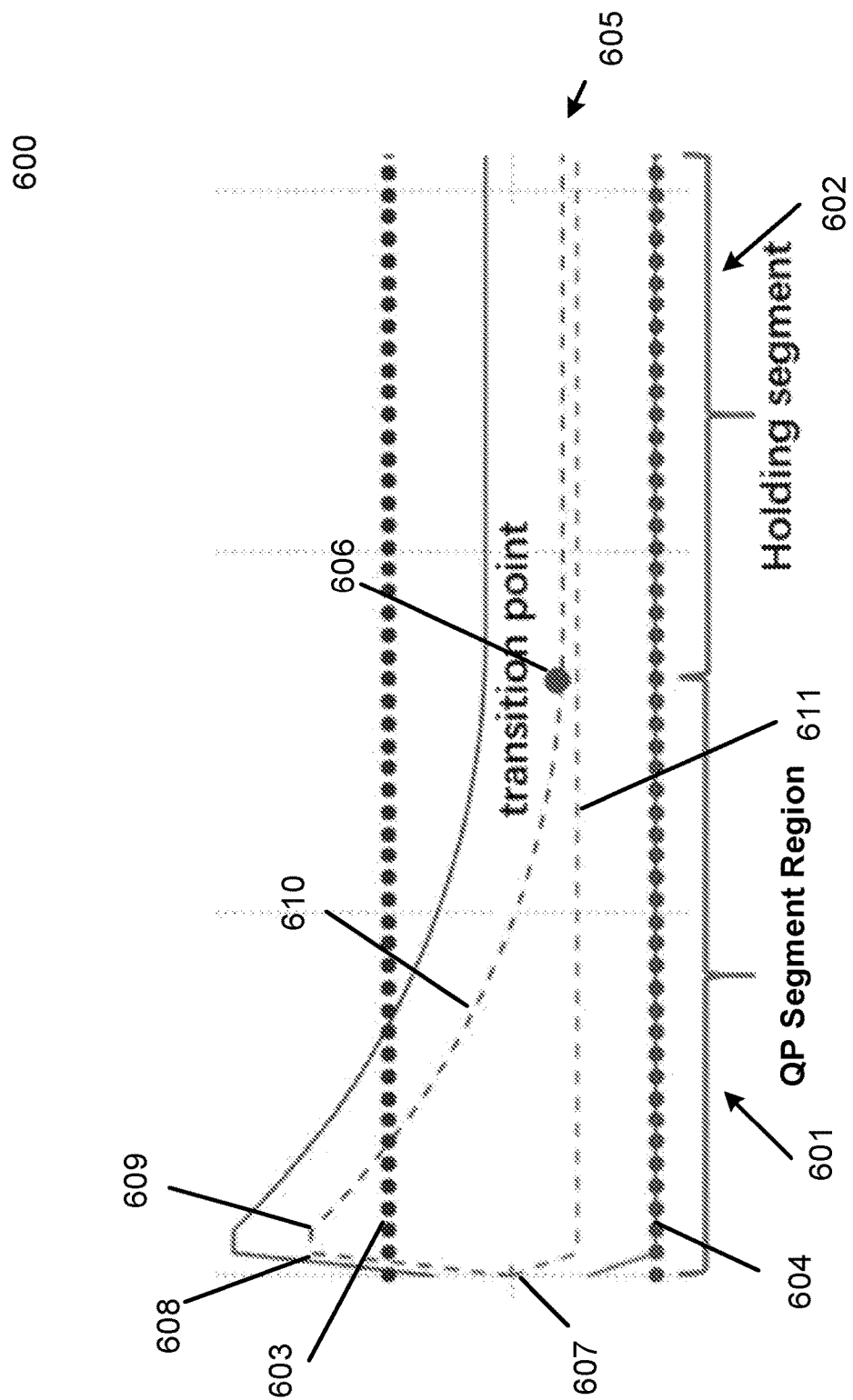
FIGS. 6-7 are diagrams illustrating examples of a method to pull over an ADV at a destination point at a side of a lane.
Figure 7:
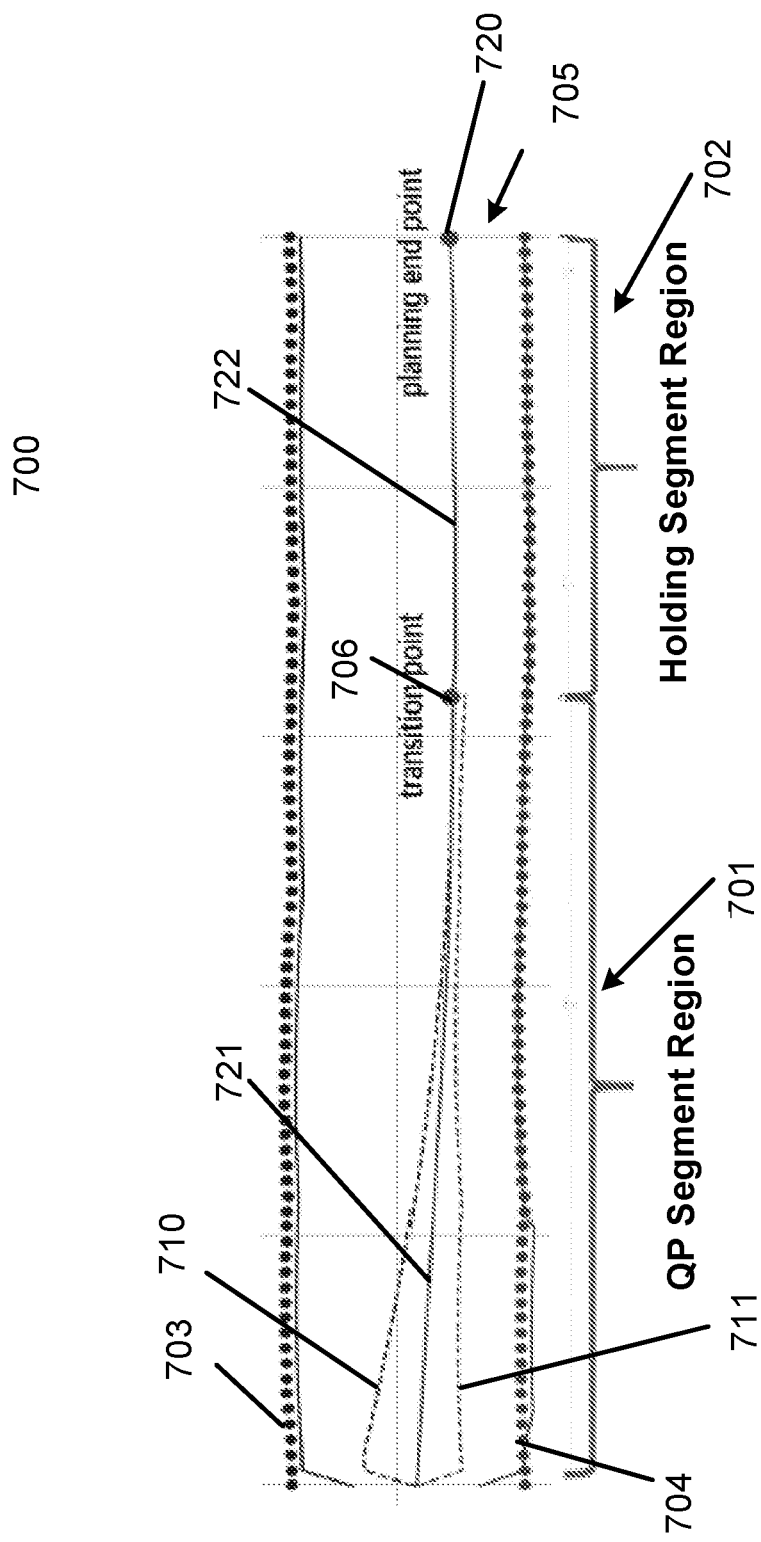

FIGS. 6-7 are diagrams illustrating examples of a method to pull over an ADV at a destination point at a side of a lane. At the end of every autopilot mission, an ADV may be expected to stop on a right side of a lane, which is convenient for passengers to get on and off. However, it is challenging for the ADV to precisely pull over such that a distance between a whole body of the ADV and a right boundary of the lane is to be small, and the ADV is to be parallel to the right boundary. For example, it might be difficult for the ADV to pull over with a small distance to the right boundary of the lane, and it might be difficult for the ADV to be parallel to the right boundary.

Disclosed here in is a method to precisely pull over an ADV based on quadratic programming (QP). By using this method, an ADV may be precisely pulled over such that a distance between a whole body of the ADV and a right boundary of the lane is small, and the ADV is parallel to the right boundary. The method may result in a high distance accuracy and a high success rate in pulling over the ADV.

Referring to FIG. 6 and FIG. 7, a path to precisely pull over an ADV to a roadside may be planned by generating a path including two parts, an QP segment (e.g., 721) in an QP segment region (e.g., 601, 701) and a holding segment (e.g., 722) in a holding segment region (e.g., 602, 702). The QP segment (e.g., 721) may be configured to get the ADV closer to the roadside, and the holding segment (e.g., 722) may be configured to keep the ADV parallel to the roadside.

In one embodiment, a left lane boundary (e.g., 603, 703) and a right lane boundary (e.g., 604, 704) of a lane (e.g., 605, 705) where the ADV is driving along may be obtained. A lane type of the lane, such as whether the lane (e.g., 605, 705) is permitted to pass from a left side may also be obtained. For example, the lane 605 in FIG. 6 is permitted to pass from the left side. For another example, the lane 705 in FIG. 7 is not permitted to pass from the left side.

Lane sample points may be projected to an SL coordinates according to a reference line, e.g., generated by routing module 307. The SL projection may be based on a continuous curvature derivative smooth reference line. In Cartesian space, obstacles and the ADV status may be described with location and heading (x, y, θ), as well as curvature and the derivative of curvature (κ, dκ) for the ADV. Then, these may be mapped to the SL coordinates (s, l, dl, ddl, dddl), which represent station, lateral, and lateral derivatives of the ADV. In an SL coordinate system, path coordinates of a path are station S (a distance along the path) and lateral coordinate L (a distance a point is from the path, measured on a line that intersects the point and the path, and is perpendicular to the path at the point of intersection).

As discussed above, the SL coordinate system for the ADV is a coordinate system that references a fixed reference point to follow a reference line. For example, a (S, L)=(1, 0) coordinate can denote one meter ahead of a stationary point (i.e., the reference point) on the reference line with zero meter lateral offset. A (S, L)=(2, 1) reference point can denote two meters ahead of the stationary reference point along the reference line and one meter lateral offset from the reference line, e.g., offset to the left by one meter.

In one embodiment, perception module 302 may be configured to detect a driving environment based on sensors mounted on the ADV. For example, perception module 302 may check whether the right side is safe or not. If there are obstacles on the right side, particularly, if there is dynamic obstacle cut in from the right side, pulling over is forbidden.

The transition point (e.g. 606, 706) is an end of the QP segment (e.g., 721). The transition point (e.g., 601, 701) may be decided according to a distance to a destination point (e.g., 720) and a desired distance to the right boundary (e.g., 604, 704) of the lane (e.g., 605, 705). For example, as the ADV gets closer to the destination point (e.g., 720) in a next planning cycle, the transition point may move forward.

The ADV may be configured to determine a left constraint (e.g., 610, 710) and a right constraint (e.g., 611, 711) of the QP segment (e.g., 721). The right constraint (e.g., 611, 711) may be based on the right lane boundary (e.g., 604, 704) of the QP segment (e.g., 721). For example, the right constraint (e.g., 611, 711) may be determined to be a half width of the ADV away from the right lane boundary (e.g., 604, 704).

In one embodiment, the left constraint (e.g., 610, 710) of the QP segment (e.g., 721) may be determined. The left constraint (e.g., 610, 710) of the QP segment (e.g., 721) may be based on a lane type of the lane, such as whether the lane (e.g., 605, 705) is permitted to pass from a left. For example, the lane 605 in FIG. 6 is permitted to pass from the left side, thus, the left constraint 610 may be extended beyond the left boundary 603 of the lane 605, e.g., by a width of the ADV. For another example, the lane 705 in FIG. 7 is not permitted to pass from the left side, thus, thus, the left constraint 710 may not be extended beyond the left boundary 703 of the lane 705.

In determining the left constraint (e.g., 610, 710) of the QP segment (e.g., 721), a first few left constraints may be kept in their respective positions as in a cruise control. A number of the first few left constraints may be 2, 3, 4, 5, 6, 7, 8, 9, 10, or any values therebetween. As illustrated in FIG. 6, The first point 607 may be kept at a current position of the ADV. A second point 608 and a third point 609 may be kept as in the cruise control. Because the lane 605 is permitted to pass from a left side, in order to be able to avoid obstacles, the left constraints may be extended to the left side of the lane. In one embodiment, a curved line 610 may be used to connect the first few left constraints (e.g., 607, 608, 609) to the transition point 606. As an example, the curved line 610 may be an arc, a part of a circumference of a circle. As another example, the curved line may a part of other curves, such as an elliptical curve, a parabolic curve.

After obtaining the left constraints (e.g., 610, 710) and right lateral constraints (e.g., 611, 711) of the QP segment (e.g., 721), QP optimization (QP solver) may be used to generate the QP segment (e.g., 721). QP optimization is the process of solving a special type of mathematical optimization problem—specifically, a linearly constrained quadratic optimization problem, that is, the problem of optimizing (minimizing or maximizing) a quadratic function of several variables subject to linear constraints on these variables. QP is a particular type of nonlinear programming.

In one embodiment, an QP optimization may be performed on a target function or cost function such that a total cost of the target function or cost function reaches minimum while a set of constraints are satisfied. In one embodiment, a polynomial or a polynomial function may be used to represent a planned path. The term of polynomial optimization or polynomial fit refers to the optimization of the shape of a curve (in this example, a generated path) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point may be divided into a number of segments (or pieces), each segment corresponding to a control point (or reference point). Such a segmented polynomial curve may be referred to as a piecewise polynomial. When optimizing the piecewise polynomial, a set of joint constraints and a set of boundary constraints between two adjacent segments have to be satisfied, in addition to a set of initial state constraints and end state constraints.

For example, the polynomial function for a path may be one dimensional as:

$$l(s) = p_0 + p_1 s + p_2 s^2 + \ldots + p_n s^n,$$

where s, l represents a station-lateral one dimensional (s, l) geometric coordinate for a polynomial to the nth order, and $p_{0 \ldots n}$ are coefficients of the one dimensional polynomials to be solved. For example, n may be 5 for a quantic polynomial function.

QP optimization may be used to optimize a path based on a cost function in the SL coordinates. QP optimization may be performed to find an optimal function of lateral coordinate l=f(s) with respect to station coordinate in SL coordinates, based on the cost function. The cost functional may be a combination of lane cost and smoothness cost. In one embodiment, the cost function may be as below.

$$C_s(f) = w_0 \int (f(s))^2 ds + W_1 \int (f'(s))^2 ds + w_2 \int (f''(s))^2 ds + w_3 \int (f'''(s))^2 ds$$

Where $C_s(f)$ represents a total cost, f(s) represents a planned path in SL coordinates, $w_0 \int (f(s))^2 ds$ represents a cost associated with a difference between the planned path and a reference line, and $w_1 \int (f'(s))^2 ds + w_2 \int (f''(s))^2 ds + w_3 \int (f'''(s))^2 ds$ represents a cost associated with a smoothness of the planned path. In the smoothness cost functional, f'(s) represents the heading difference between the lane and the ADV, f''(s) is related to the curvature of the path, and f'''(s) is related to the derivative of the curvature.

Referring to FIG. 7, a planned path of QP segment 721 may be generated by QP optimization based on the above cost function, according to the left constraints 710 and right lateral constraints 711 of the QP segment 721.

However, a path only including the QP segment (e.g., 721) may not be able to keep the ADV parallel to the road side, which is the right boundary 704 of the lane 705. In addition, the right lane boundary 704 may be not in a straight and smooth line. The holding segment (e.g., 722) may give some time for control module 306 to adjust an orientation of the ADV. It may be advantageous to have the holding segment 722 such that the ADV is parallel to the right boundary 704 of the lane 705.

In one embodiment, if the right lane boundary 704 between the transition point 706 and the destination point 702 is in a shape of a straight and smooth line, the holding segment 722 may be generated based on the shape of the right lane boundary 704. For example, in SL coordinates, the holding segment 722 may be generated by translating the right lane boundary 704 upward and connecting with the QP segment 721 at the transition point 706, as illustrated in FIG. 7.

If the shape of right lane boundary 704 is complex and not in a shape of a straight and smooth line, the holding segment may be generated by another QP optimization (QP solver), which is similar to the process discussed above.

In one embodiment, a right constraint 711 of the holding segment 722 may be determined based on the shape of the right lane boundary 704 in the holding segment region 702. For example, the right constraint 711 of the holding segment 722 may be in the shape of the right lane boundary 704 and a half width of the ADV away from the right lane boundary 704. The left constraint 710 of the holding segment 722 may be based on a predetermined distance threshold between the whole body of the ADV and the right boundary 704 of the lane 705. For example, the left constraint 710 of the holding segment 722 may be the predetermined distance threshold away from the right constraint 711 of the holding segment 722. The predetermined distance threshold between the whole body of the ADV and the right boundary 704 of the lane 705 may be 10 cm, 15 cm, 20 cm, 30 cm, 50 cm, or any values therebetween. For example, the predetermined distance threshold may be between 15 cm to 20 cm. In this way, the ADV may be controlled to precisely pull over such that the distance between a whole body of the ADV and a right boundary of the lane is smaller than the predetermined distance threshold, and the ADV is to be parallel to the right boundary.

Figure 8:
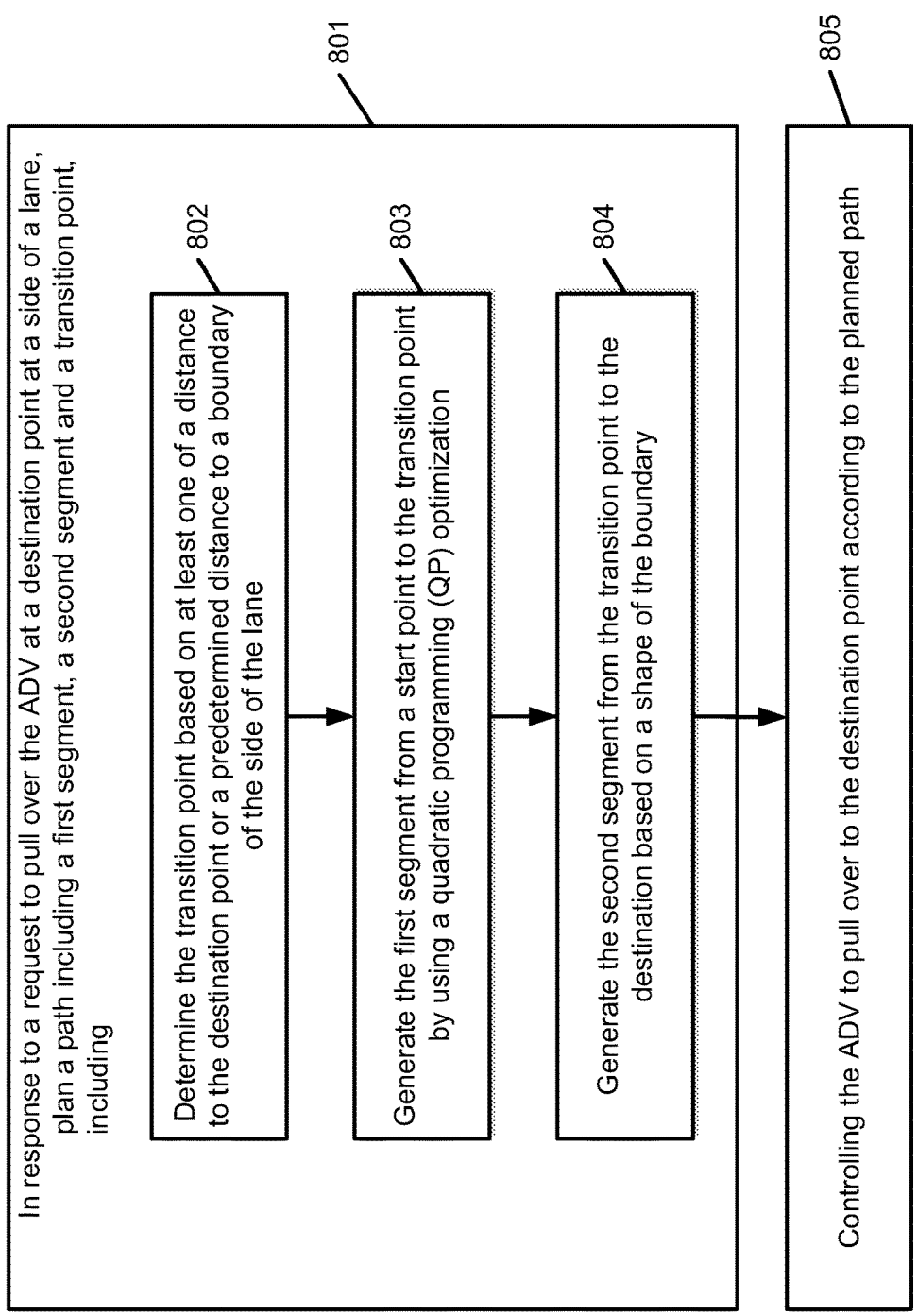
FIG. 8 is a flow diagram illustrating an example of a method to pull over an ADV at a destination point at a side of a lane.

FIG. 8 is a flow diagram 800 illustrating an example of a method to pull over an ADV at a destination point at a side of a lane, according to some embodiments. Process 800 may be performed by processing logic which may include software, hardware, or a combination thereof. For example, process 800 may be performed by planning module 305. Referring to FIG. 8, in operation 801, processing logic, in response to a request to pull over the ADV at a destination point at a side of a lane, plans a path including a first segment, a second segment and a transition point. Operation 801 includes operation 802, 803 and 804. In operation 802, processing logic determines the transition point based on at least one of a distance to the destination point or a predetermined distance to a boundary of the side of the lane. In operation 803, processing logic generates the first segment from a start point to the transition point by using a quadratic programming (QP) optimization. In operation 804, processing logic generates the second segment from the transition point to the destination based on a shape of the boundary. In operation 805, processing logic controls the ADV to pull over to the destination point according to the planned path.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
in response to a request to pull over the ADV at a destination point at a side of a lane, planning a path having a first segment, a second segment, and a transition point, including
determining the transition point based on at least one of a distance to the destination point or a predetermined distance to a boundary of the side of the lane,
generating the first segment from a start point to the transition point using a quadratic programming (QP) optimization, and
generating the second segment from the transition point to the destination point based on a shape of the boundary of the side of the lane, comprising
determining whether the shape of the boundary is in a shape of a straight and smooth line; and
controlling the ADV to pull over to the destination point according to the planned path.

2. The method of claim 1, wherein generating the first segment from the start point to the transition point using the QP optimization comprises determining a first constraint based on the boundary of the side of the lane.

3. The method of claim 2, wherein generating the first segment from the start point to the transition point using the QP optimization includes determining a second constraint.

4. The method of claim 1, wherein the QP optimization is based on a cost function, and wherein the cost function is determined based on at least one of a distance between the planned path and a reference line, or a smoothness of the planned path.

5. The method of claim 1, wherein the generating the second segment from the transition point to the destination point based on the shape of the boundary further comprises:
determining that the shape of the boundary is in the shape of the straight and smooth line; and
generating the second segment by using the shape of the boundary.

6. The method of claim 1, wherein the generating the second segment from the transition point to the destination point based on the shape of the boundary further comprises:
determining that the shape of the boundary is not in the shape of the straight and smooth line;
generating the second segment by using a second QP optimization.

7. A non-transitory machine-readable medium having instructions stored therein, which when executed by a processor, cause the processor to perform operations, the operations comprising:
in response to a request to pull over an autonomous driving vehicle (ADV) at a destination point at a side of a lane, planning a path including a first segment, a second segment and a transition point, including
determining the transition point based on at least one of a distance to the destination point or a predetermined distance to a boundary of the side of the lane,
generating the first segment from a start point to the transition point by using a quadratic programming (QP) optimization, and
generating the second segment from the transition point to the destination point based on a shape of the boundary, comprising
determining whether the shape of the boundary is in a shape of a straight and smooth line; and
controlling the ADV to pull over to the destination point according to the planned path.

8. The medium of claim 7, wherein generating the first segment from the start point to the transition point by using the QP optimization comprises determining a first constraint based on the boundary.

9. The method of claim 8, wherein generating the first segment from the start point to the transition point using the QP optimization comprises determining a second constraint.

10. The medium of claim 7, wherein the QP optimization is based on a cost function, and wherein the cost function is determined based on at least one of a distance between the planned path and a reference line, or a smoothness of the planned path.

11. The medium of claim 7, wherein the generating the second segment from the transition point to the destination point based on the shape of the boundary further comprises:
 determining that the shape of the boundary is in the shape of the straight and smooth line; and
 generating the second segment by using the shape of the boundary.

12. The medium of claim 7, wherein the generating the second segment from the transition point to the destination point based on the shape of the boundary further comprises:
 determining that the shape of the boundary is not in the shape of the straight and smooth line;
 generating the second segment by using a second QP optimization.

13. A data processing system, comprising:
 a processor; and
 a memory coupled to the processor to store instructions, which when executed by the processor, cause the processor to perform operations, the operations including
  in response to a request to pull over an autonomous driving vehicle (ADV) at a destination point at a side of a lane, planning a path including a first segment, a second segment and a transition point, including
   determining the transition point based on at least one of a distance to the destination point or a predetermined distance to a boundary of the side of the lane,
   generating the first segment from a start point to the transition point using a quadratic programming (QP) optimization, and
   generating the second segment from the transition point to the destination point based on a shape of the boundary, comprising
    determining whether the shape of the boundary is in a shape of a straight and smooth line; and
   controlling the ADV to pull over to the destination point according to the planned path.

14. The system of claim 13, wherein generating the first segment from the start point to the transition point using the QP optimization comprises determining a first constraint based on the boundary.

15. The system of claim 14, wherein generating the first segment from the start point to the transition point using the QP optimization comprises determining a second constraint.

16. The system of claim 13, wherein the QP optimization is based on a cost function, and wherein the cost function is determined based on at least one of a distance between the planned path and a reference line, or a smoothness of the planned path.

17. The system of claim 13, wherein the generating the second segment from the transition point to the destination point based on the shape of the boundary further comprises:
 determining that the shape of the boundary is in the shape of the straight and smooth line; and
 generating the second segment by using the shape of the boundary.

18. The system of claim 13, wherein the generating the second segment from the transition point to the destination point based on the shape of the boundary further comprises:
 determining that the shape of the boundary is not in the shape of the straight and smooth line;
 generating the second segment by using a second QP optimization.

* * * * *